US011656685B1

(12) United States Patent
Brocklesby et al.

(10) Patent No.: US 11,656,685 B1
(45) Date of Patent: May 23, 2023

(54) INFORMATION HANDLING SYSTEM KEYBOARD WITH HAPTIC ENHANCED MEMBRANE TRIGGER

(71) Applicant: Dell Products L.P., Round Rock, TX (US)

(72) Inventors: Brandon J. Brocklesby, Pflugerville, TX (US); Robert D. Hrehor, Jr., Round Rock, TX (US); Chiu-Jung Tsen, Zhubei (TW); Hsu-Feng Lee, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/730,347

(22) Filed: Apr. 27, 2022

(51) Int. Cl.
 *G06F 3/02* (2006.01)
 *G06F 3/01* (2006.01)

(52) U.S. Cl.
 CPC ............ *G06F 3/016* (2013.01); *G06F 3/0202* (2013.01)

(58) Field of Classification Search
 None
 See application file for complete search history.

(56) References Cited

U.S. PATENT DOCUMENTS

| 10,409,391 | B2 | 9/2019 | Silvanto et al. |
| 11,513,600 | B1 | 11/2022 | Hrehor et al. |
| 2009/0167694 | A1* | 7/2009 | Tan ................... G06F 3/04886 340/407.2 |
| 2013/0050095 | A1 | 2/2013 | Nakajima |
| 2014/0066285 | A1 | 3/2014 | Beall et al. |
| 2014/0203953 | A1* | 7/2014 | Moser ................ G06F 3/04886 341/27 |
| 2014/0340208 | A1 | 11/2014 | Tan et al. |
| 2018/0074694 | A1 | 3/2018 | Lehmann |
| 2018/0217669 | A1 | 8/2018 | Ligtenbert et al. |
| 2019/0187792 | A1* | 6/2019 | Basehore ............... G06F 3/017 |
| 2020/0142452 | A1* | 5/2020 | Sen .................... H05K 7/20336 |
| 2020/0192484 | A1 | 6/2020 | Lehmann et al. |

* cited by examiner

*Primary Examiner* — Carl Adams
(74) *Attorney, Agent, or Firm* — Zagorin Cave LLP; Robert W. Holland

(57) ABSTRACT

A portable information handling system includes a keyboard having a first set of conventional keys with a first travel distance to impact a membrane, such as keys having rubber dome biasing devices, and a second set of keys having a second smaller travel distance to impact the membrane with an alternative biasing device and haptic feedback to reinforce an input feel for an end user. In one example embodiment, the second set of keys are biased upward with a compressible foam with the membrane raised by a platform structure under the second set of keys and a piezoelectric device under the membrane for each key to provide a vibration when the membrane detects an input.

19 Claims, 4 Drawing Sheets

INFORMATION HANDLING SYSTEM KEYBOARD WITH HAPTIC ENHANCED MEMBRANE TRIGGER

BACKGROUND OF THE INVENTION

Field of the Invention

The present invention relates in general to the field of portable information handling systems, and more particularly to an information handling system keyboard with haptic enhanced membrane trigger.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches, and often operate with separate keyboards, such as held in a portfolio holder. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally end users prefer to type at keyboards that have mechanical key movement. Key presses depress the key into the keyboard to contact a membrane below the key and close a switch to report the key input through a matrix. The mechanical key movement helps an end user to gauge when a key input is complete. A difficulty with mechanical key movement is that the keyboard tends to have a greater height that results in the information handling system housing having an increased thickness. One alternative to the use of mechanical keyboards is to use keyboards with fixed keys that do not move or depress and therefore have a thinner profile. For example, a capacitive touchscreen can display a keyboard that detects touches as key inputs. End user's often have difficulty interacting with such keyboards because the lack of key movement prevents the end user from having a feel for when a keystroke is completed. One alternative is to provide feedback to the end user with a haptic device that causes a vibration at a key when an input is complete. In some instances, keyboards will use full mechanical movements for keys that are most commonly pressed, such as letters, and non-moving haptic keys for less commonly used keys, such as shift, control or enter. The mixture of mechanical and non-mechanical keys can cause confusion for the end user and take time to become used to the feel.

SUMMARY OF THE INVENTION

Therefore, a need has arisen for a system and method which provides a mechanical movement in a reduced vertical travel and having a haptic feedback response.

In accordance with the present invention, a system and method are provided which substantially reduce the disadvantages and problems associated with previous methods and systems for managing haptic feedback at a portable information handling system keyboard. The keyboard has a first region with keys that travel a first distance to contact a keyboard membrane and a second region with keys that travel a second and smaller distance to contact a keyboard membrane, the second region having key inputs confirmed with a haptic response, such as by a piezoelectric haptic response device. A compressible biasing device biases the keys of the second region to a raised position and compresses in response to a press down so that the second region with the haptic response has a key input feel similar to the first region of the greater travel distance.

More specifically, a portable information handling system processes information with processing components disposed in a portable housing, such as a processor that executes instructions to process information and a memory that stores the instructions and information. A keyboard coupled to the housing accepts keyed inputs at plural keys having a first set of the plural keys configured to depress a first distance and a second set of the plural keys configured to press a second distance of less than the first distance. The second set of plural keys mimic a full mechanical distance press by initiating a haptic response when the key contacts the keyboard membrane. A different type of biasing device holds the first and second sets of keys in an elevated position over the keyboard membrane, such as a conventional rubber dome for the first set of keys having the greater key depression distance and a compressible foam for the second set of keys having the smaller key depression distance.

The present invention provides a number of important technical advantages. One example of an important technical advantage is that mechanical keys of different stroke distances are supported in a keyboard that have a similar key interaction feel for an end user. Keys in the keyboard interior have a full depression stroke with conventional mechanical key input feedback, such as is provided by a rubber dome type of biasing device. Keys along the keyboard perimeter have a mechanical depression to perform an input at the same keyboard membrane as the interior keys but with a reduced stroke distance and biased upward by a compressible material, such as foam. A piezoelectric haptic device below each of the second set of keys provides additional feedback to the end user of the completed input to mimic the full depression keystroke for an improved end user experience. The vertical space saved along the housing perimeter by use of the reduced mechanical depression provides room for other components, such as ports, to help reduce the Z-height of the information handling system housing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system keyboard has a portion of the plural keys configured to have some mechanical movement with feedback of an input confirmed by a haptic response. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
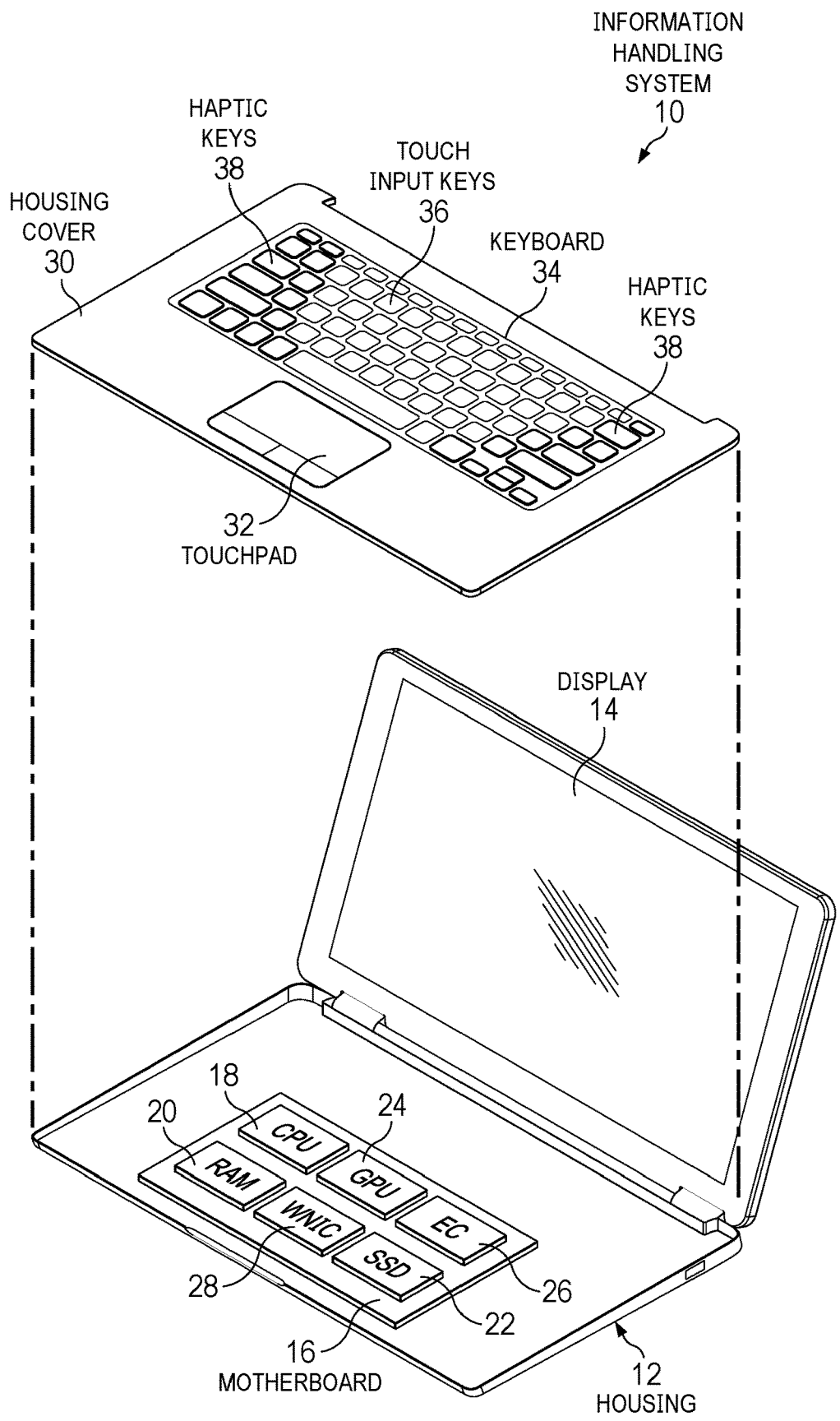
FIG. 1 depicts an exploded view of a portable information handling system having a keyboard with both conventional keys and haptic response keys.

Referring now to FIG. 1, an exploded view depicts a portable information handling system 10 having a keyboard 34 with both conventional touch input keys 36 and haptic response keys 38. In the example embodiment, information handling system 10 is built in a portable housing 12 having a display 14 coupled to a lid portion and a motherboard 16 coupled to a base portion. A central processing unit (CPU) 18 coupled to motherboard 16 executes instructions that process information in cooperation with a random access memory (RAM) 20 that stores the instructions and information. A solid state drive (SSD) 22 provides persistent storage of information and instructions, such as an operating system and applications that are retrieved to RAM 20 to execute on CPU 18. A graphics processing unit (GPU) 24 further processes information to define visual images for presentation at display 14. An embedded controller 26 manages physical operations at information handling system 10, such as application of power, maintenance of thermal constraints and interactions with input and output devices, such as keyboard 34 and a touchpad 32. A wireless network interface controller (WNIC) 28 provides communication with external networks and devices, such as through WiFi and BLUETOOTH signals. A housing cover 30 couples over housing 12 to cover the processing components and support keyboard 34 and touchpad 32 in a position at which an end user can make inputs.

In the example embodiment, keyboard 34 has plural keys, such as a standard QWERTY configuration, that include a set of conventional touch input keys 36 and a set of haptic response keys 38. To improve the end user experience, both sets of keys accept inputs with some mechanical downward travel, however, the haptic response keys have a smaller travel distance than the conventional touch input keys. To reinforce completion of an input at the haptic response keys, as the key press down and an input is made a haptic response is provided under the key, such as by a piezoelectric device. The set of haptic response keys are disposed at opposing sides of keyboard 34 near the perimeter of housing 12 and include keys that are pressed less often, such as shift, enter, tab, control and capital lock keys. Having reduced vertical travel for keys located on the perimeter of housing 12 advantageously spares vertical height within housing 12 to fit other components, such as ports that accept cables, while maintaining a reduced housing Z-height. A greater vertical travel of keys within the inner perimeter of keyboard 34 enhances the end user experience with a conventional keyboard feel. By including a slightly different feel with a conventional biasing device type under the central keys, such as a rubber dome, and a compressible biasing device type under the perimeter keys, such as compressible foam, and then enhancing presses of the perimeter keys with a haptic device to mimic the feel of a conventional biasing device type. As an example, a keyboard with 3 mm of vertical height may simulate conventional key depression travel while only depressing the haptic key 0.2 mm.

Figure 2:
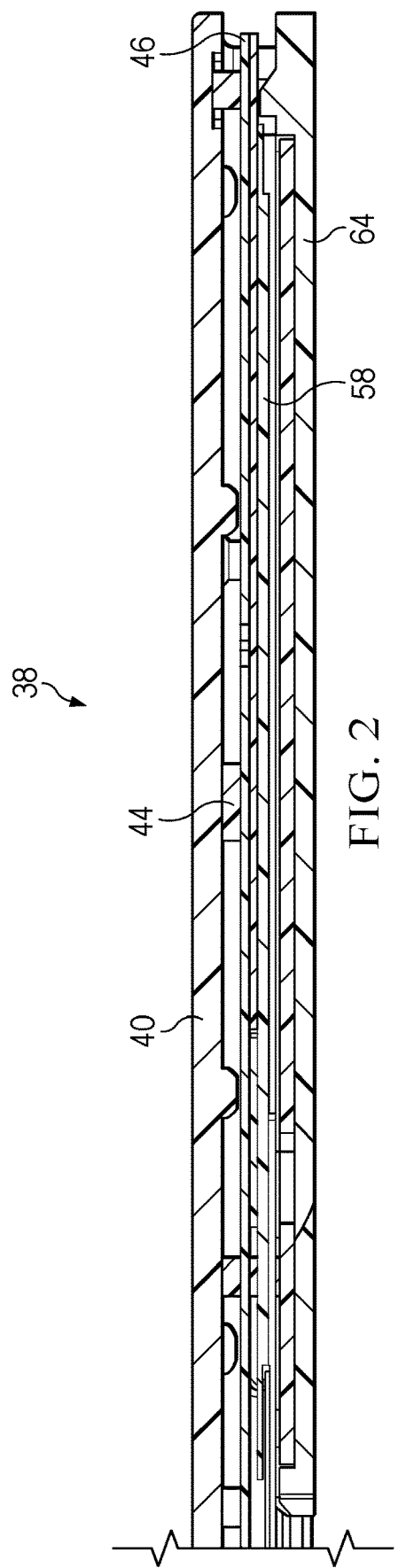
FIG. 2 depicts a side cross-sectional view of the keyboard having both conventional keys and haptic response keys.

Referring now to FIG. 2, a side cross-sectional view depicts the keyboard 34 having both conventional keys 36 and haptic response keys 38. A plastic keycap 40 is exposed at the upper surface of haptic response keys 38 to accept end user inputs made by a press down on the key. For instance, one plastic keycap 40 is included for each of the set of haptic response keys and is held in a raised position by a compressible biasing device 44, such as one or more pieces of compressible foam that biases the keycap over a keyboard membrane 46. Keyboard membrane 46 is a conventional switch membrane having a contact location under each key that detects a key touch and reports a key input in response to the key touch. For instance, when an end user presses on keycap 40, the press overcomes upward bias of compressible biasing device 44 to touch against a switch location of keyboard membrane 46 to report an input associated with the keycap. When the end user releases keycap 40, compressible biasing device 44 biases the keycap back to the raised position. To enhance the feel of an input, a haptic device, such as a piezoelectric device 58 is actuated under the keycap, providing a vibration feedback of the input. Keyboard membrane 46 is raised under haptic keys relative to the conventional keys by platform 64 that has a solid surface under the membrane switches to trigger the switch in response to the input. The space under platform 64 is available for placement of components, such as cable ports located at the housing perimeter.

Figure 3:
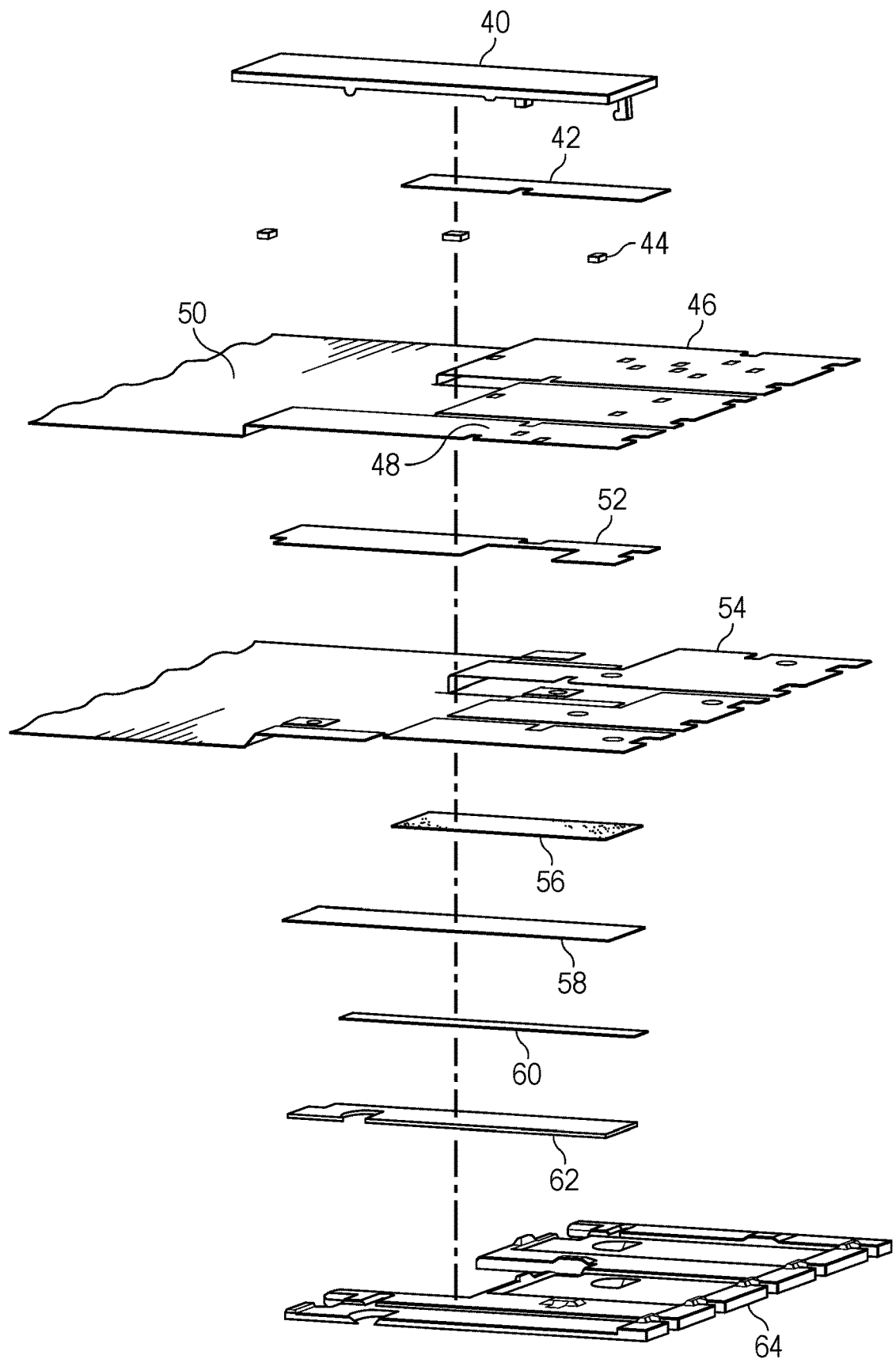
FIG. 3 depicts an exploded perspective view of the keyboard having both conventional keys and haptic response keys.

Referring now to FIG. 3, an exploded perspective view depicts the keyboard 34 having both conventional keys located in a touch input region 50 and haptic response keys located in a haptic key region 48. Keycap 40 has a mylar piece 42 disposed under it and is raised over keyboard membrane 46 by compressible biasing devices 44, such as a compressible foam. In the conventional touch input region 50 a greater travel distance is established compared to haptic key region 48 so that a keycap 40 biased upward by a conventional biasing device, such as a rubber dome, has to travel a greater distance to contact switch membrane 46. Since both the haptic and conventional keys perform inputs by contacting keyboard membrane 46, all key inputs may be managed through a single keyboard matrix circuit. The keyboard circuit interfaces with a underlying flexible printed circuit 54 held in place against keyboard membrane 46 with an adhesive 52 so that detection of a key input at keyboard membrane 46 signals actuation of a piezoelectric haptic device 58 fit under the key shape and held in place by adhesive 56. In the example embodiment, piezoelectric haptic device 58 has a rectangular shape similar to the key that is associated with an input at that location. Adhesive 60 and a mylar insulation 62 couple piezoelectric haptic device 58 to platform 64 so that actuation of the haptic device translates vibration to keycap 40 when pressed downward to contact keyboard membrane 46. In addition to providing a signal to actuate piezoelectric haptic device 58, flexible printed circuit (FPC) 54 and include microLEDs that illuminate the keys as a backlight. Although the example embodiment uses a compressible foam to bias keycap 40 upwards, in alternative embodiments other biasing devices may be used, such as springs or other resilient materials. In instances of keyboard keys having a large area, such as the space key, multiple switch sensors may be included in the keyboard membrane to detect key inputs and enhance key uniformity.

Figure 4:
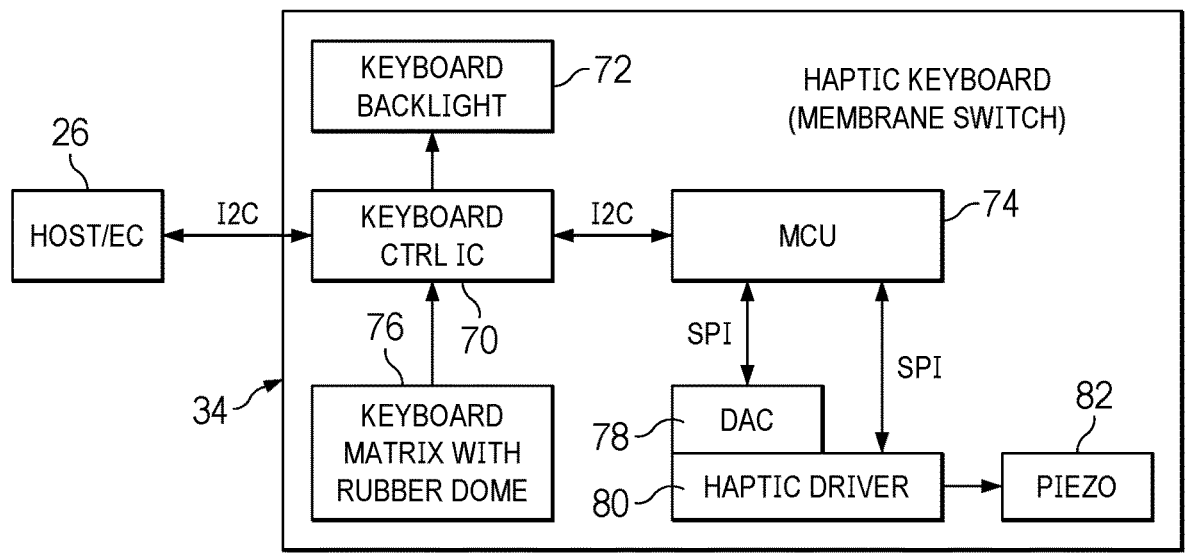
FIG. 4 depicts a logical block diagram of a system for managing haptic response at the keyboard.

Referring now to FIG. 4, a logical block diagram depicts a system for managing haptic response at the keyboard 34. A keyboard controller integrated circuit 70 interfaces with the host system embedded controller 26 to report key inputs. When a conventional key press is detected, such as a key having a rubber dome, the keyboard matrix 76 reports the key input through keyboard controller 70 to embedded controller 26. When a haptic key press is detected, the keyboard membrane reports the switch contact through keyboard matrix to keyboard controller 70 and then embedded controller 26 in the same manner; however, a press at a haptic key location is also reported via an I2C bus to a microcontroller unit (MCU) 74 to command the haptic response. The key location is provided by a SPI link to a digital to analog converter 78 and a haptic driver 80 to a piezo electric device 82 to cause the haptic feed back vibration. For example, the piezoelectric device is actuated with a signal from a flexible printed circuit where both the piezoelectric device and the flexible printed circuit are disposed under the keyboard membrane. In the example embodiment, a backlight 72 included in the flexible printed circuit is selectively illuminated by keyboard controller integrated circuit 70, such as in response to a command from embedded controller 26.

Figure 5:
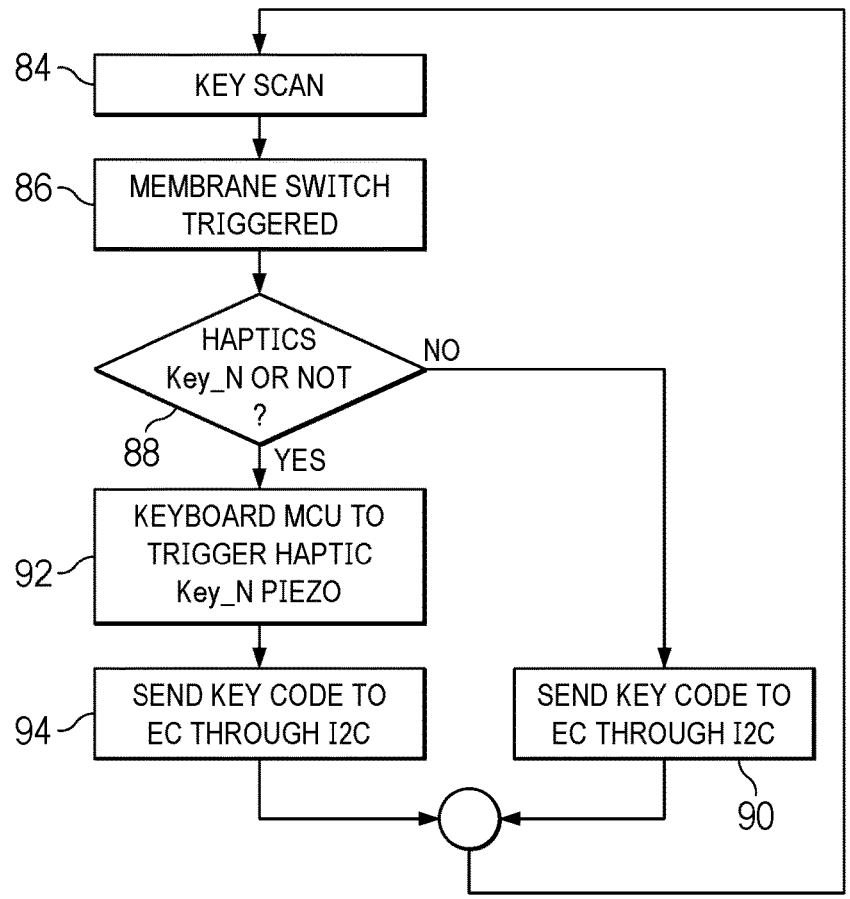
FIG. 5 depicts a flow diagram of a process for managing haptic response at the keyboard.

Referring now to FIG. 5, a flow diagram of a process for managing haptic response at the keyboard. The process starts at step 84 with a key scan of the keyboard membrane matrix to detect a keyboard membrane switch actuation. At step 86 a keyboard membrane switch is triggered by a contact of a keycap with a downward press against the keyboard membrane. At step 88 a determination is made of whether the keyboard membrane switch that was activated is associated with a haptic response, such as by comparing the keyboard matrix value against a table of keys associated with the haptic response. If the keyboard membrane switch activation is not associated with a haptic response, the process continues to step 90 to send the key code to the embedded controller through an I2C link. If at step 88 the keyboard code is associated with a key having a haptic response, the process continues to step 92 to communicate the key code to the MCU and trigger the haptic response by actuating the piezoelectric haptic device associated with the key input. At step 94 the key code associated with the input is communicated by the I2C link to the embedded controller. The process then returns to step 84 at the next key scan.

Although the present invention has been described in detail, it should be understood that various changes, substitutions and alterations can be made hereto without departing from the spirit and scope of the invention as defined by the appended claims.

What is claimed is:

1. A portable information handling system comprising:
   a housing;
   a processor disposed in the housing and operable to execute instructions that process information;
   a memory disposed in the housing and interfaced with the processor, the memory operable to store the instructions and information; and
   a keyboard coupled to the housing and interfaced with the processor, the keyboard having plural keys to accept end user key inputs, a membrane disposed under the keys to detect a key input when the key moves downward to hit the membrane and at least one piezoelectric device disposed under one of the plural keys to actuate when the one of the plural keys contacts the membrane, a first set of the plural keys having a first vertical travel to hit the membrane, a second set of the plural keys have a second vertical travel to contact the membrane, the second vertical travel greater than the first vertical travel, the at least one piezoelectric device under each key of the first set of plural keys to create a haptic effect when the key of the first set of plural keys presses against the membrane, none of the second set of keys having the piezoelectric device underneath, the piezoelectric devices not creating a haptic effect when the key of the second set of plural keys presses against the membrane.

2. The portable information handling system of claim 1 further comprising:
   plural piezoelectric devices disposed under the first set of plural keys;
   wherein each of the plural piezoelectric devices aligns with an associated one of the first set of plural keys to actuate when the associated one of the first set of plural keys contacts the membrane.

3. The portable information handling system of claim 1 further comprising a compression material disposed between the one of the plural keys to bias the one of the plural keys to a raised position over the membrane.

4. The portable information handling system of claim 1 wherein the compressible material comprises a foam.

5. The portable information handling system of claim 1 further comprising a raised support platform disposed under the first set of plural keys to raise the membrane under the first set of keys.

6. The portable information handling system of claim 5 further comprising:
a first type of biasing device disposed under each key of the first set of plural keys to bias each of the first set of plural keys away from the membrane; and
a second type of biasing device disposed under each key of the second set of plural keys to bias each of the second set of plural keys away from the membrane, the first and second biasing devices of a different type.

7. The portable information handling system of claim 6 wherein the first type of biasing device comprises foam.

8. The portable information handling system of claim 7 wherein the second type of biasing device comprises a rubber dome.

9. A method for performing key inputs at an information handling system keyboard having plural keys, the method comprising:
pressing on first key of a first set of the plural keys to depress the first key a first distance to record an input on a membrane;
pressing on a second key of a second set of plural keys to depress the second key a second distance to record an input on the membrane, the second distance less than the first distance; and
responding to the second key input with haptic vibration but not to the first key input.

10. The method of claim 9 further comprising:
biasing the first key to a raised position over the membrane with a first biasing device; and
biasing the second key to the raised position over the membrane with a second biasing device of a type different than the first biasing type.

11. The method of claim 10 wherein the second biasing device comprises a compressible foam.

12. The method of claim 9 wherein the haptic vibration is generated with a piezoelectric device disposed below the membrane.

13. The method of claim 9 further comprising raising the membrane on a platform under the second key of the second set of plural keys.

14. The method of claim 9 further comprising:
aligning a piezoelectric device under each key of the second set of plural keys; and
providing a haptic vibration in response to an input at each of the second set of plural keys and none of the first set of plural keys.

15. The method of claim 14 further comprising illumination the plural keys with a flexible printed circuit having lights and disposed below the membrane and the piezoelectric devices.

16. A keyboard comprising:
plural keys to accept end user key inputs;
a membrane disposed under the plural keys to detect a key input when the key moves downward to contact the membrane; and
a piezoelectric device disposed under each key of a first set of the plural keys to actuate when an associated key of the first set plural keys contacts the membrane;
wherein the first set of plural keys each travel a first distance to contact the membrane and a second set of plural keys without associated piezoelectric devices travel a second distance to contact the membrane, the second distance greater than the first distance, the first set of plural keys having a haptic vibration in response to an input at each of the first set of plural keys and no haptic vibration in response to a press of the second set of plural keys.

17. The keyboard of claim 16 further comprising:
a first type of biasing device under each key of the first set of plural keys to bias the associated key to a raised position over the membrane; and
a second type of biasing device under each key of the second set of plural keys to bias the associated key to the raised position over the membrane, the second type of biasing device different than the first type of biasing device.

18. The keyboard of claim 17 wherein the first type of biasing device comprises foam.

19. The keyboard of claim 18 wherein the piezoelectric device is disposed under the membrane.

* * * * *